United States Patent
Li

(10) Patent No.: US 7,926,477 B2
(45) Date of Patent: Apr. 19, 2011

(54) TILE CUTTER

(75) Inventor: Jiangnan Li, Jiangsu (CN)

(73) Assignee: Nanjing Chervon Industry Co., Ltd., Nanjing, Jiangsu (CN)

( * ) Notice: Subject to any disclaimer, the term of this patent is extended or adjusted under 35 U.S.C. 154(b) by 1006 days.

(21) Appl. No.: 11/643,565

(22) Filed: Dec. 20, 2006

(65) Prior Publication Data

US 2007/0144508 A1 Jun. 28, 2007

(30) Foreign Application Priority Data

Dec. 22, 2005 (CN) ...................... 2005 2 0140152 U

(51) Int. Cl.
*B28D 1/04* (2006.01)
*B28D 7/04* (2006.01)

(52) U.S. Cl. ..... 125/13.01; 83/468.7; 83/477; 83/477.2; 125/35

(58) Field of Classification Search ............. 125/12, 125/13.01, 13.03, 35; 83/468.7, 477, 477.2, 83/436.3, 468.2, 468.1
See application file for complete search history.

(56) References Cited

U.S. PATENT DOCUMENTS

| | | | | |
|---|---|---|---|---|
| 3,635,206 A | * | 1/1972 | Harclerode | 125/13.03 |
| 3,807,095 A | * | 4/1974 | Harding et al. | 125/13.03 |
| 4,428,159 A | * | 1/1984 | Sigetich et al. | 451/213 |
| 5,676,124 A | * | 10/1997 | Lee | 125/13.01 |
| 5,947,103 A | * | 9/1999 | Saccon | 125/13.01 |
| 6,080,041 A | | 6/2000 | Greenland | |
| 6,276,990 B1 | | 8/2001 | Greenland | |
| 6,439,218 B1 | * | 8/2002 | Hulett | 125/13.01 |
| 6,672,188 B2 | * | 1/2004 | Lee | 83/168 |
| 6,679,244 B1 | * | 1/2004 | Tsao | 125/13.01 |
| 6,883,511 B1 | * | 4/2005 | Tsao | 125/13.03 |
| 7,066,068 B1 | * | 6/2006 | Caldwell | 83/435 |
| 7,279,403 B2 | * | 10/2007 | Nagai et al. | 438/462 |
| 7,406,962 B1 | * | 8/2008 | Chen | 125/13.01 |

FOREIGN PATENT DOCUMENTS

WO    WO 96/00638    1/1996

\* cited by examiner

*Primary Examiner* — Timothy V Eley

(74) *Attorney, Agent, or Firm* — McDermott Will & Emery LLP

(57) ABSTRACT

A tile cutter which has increased cutting capability and with good portability at the same time, comprises a support frame, a saw unit mounted on the support frame, at least one rail and a worktable assembly. The at least one rail is fixed on the support frame and comprises a longitudinal axis. The worktable assembly comprises at least a first worktable and a second worktable, support surfaces of which are in the same plane. The second worktable is slidably installed on the first rail and the first worktable is installed on the second worktable.

14 Claims, 4 Drawing Sheets

TILE CUTTER

CROSS-REFERENCE TO RELATED APPLICATIONS

This application claims priority to Chinese Application No. 200520140152.8 filed Dec. 22, 2005, the entire disclosure of which is incorporated herein by reference. Priority to this application is claimed under 35 U.S.C. 119, 120 and/or 365.

FEDERALLY SPONSORED RESEARCH OR DEVELOPMENT

Not Applicable.

TECHNICAL FIELD

The present invention relates to a tile cutter, in particular to a tile cutter which can increase the cutting capability.

BACKGROUND OF THE INVENTION

Conventionally, to cut a tile, the tile is directly put on a worktable which is fixed relative to the cutter. However, the maximum cutting capability of the tile cutter is generally limited by the dimension of the worktable.

To overcome such disadvantage of the conventional tile cutter, there has been a tile cutter in market, wherein a rail is arranged on the base of the tile cutter and a worktable is slidably connected to the rail by a sliding bearing or wheels, while the maximum cutting capability is still limited by the length of the rail. A common way for increasing the cutting capability is to increase the length of the rail, which results in decreasing of the portability of the tile cutter.

Another way for increasing the cutting capability is to increase the length of the portion of the worktable which is extendable beyond the rail. In order not to influence the portability of the tile cutter, the worktable may be divided into several portions which are movable relative to each other to increase the maximum support capability. Thus, a locking device is required to be arranged between at least two portions of the worktable to fix the two portions together as desired. Additionally, for such a tile cutter whose worktable is slidable relative to the rail, a locking device is required to be ranged between the worktable and the rail or the base so as to fix the worktable on the rail during transportation to avoid from being damaged.

SUMMARY OF THE INVENTION

The object of the present invention is to provide a tile cutter which has increased cutting capability and with good portability at the same time.

In order to achieve the object, the tile cutter according to the present invention comprises a support frame, a saw unit mounted on the support frame, at least one rail fixed on the support frame, and a worktable assembly. The at least one rail comprises a first rail having a longitudinal axis. The worktable assembly comprises at least a first worktable and a second worktable, support surfaces of which are in the same plane. The second worktable is slidably installed on the first rail and the first worktable is installed on the second worktable.

The second worktable has two ends opposite to each other in a direction perpendicular to the longitudinal axis of the first rail.

The first worktable of the worktable assembly is slidably connected to one of the two ends of the second worktable.

The worktable assembly of the tile cutter according to the present invention further comprises a third worktable. A support surface of the third worktable is in the plane in which the support surfaces of the first and the second worktable lie.

The third worktable of the worktable assembly is slidably installed on the other end of the two ends of the second worktable.

With the worktable assembly of the tile cutter according to the present present invention, an operator may conveniently change the support capability of the worktable assembly to accommodate work pieces having different sizes without increasing the weight and size of the cutter.

BRIEF DESCRIPTION OF THE DRAWINGS

A preferred embodiment is illustrated with reference to the accompanying drawings, in which.

DETAILED DESCRIPTION

Figure 1:
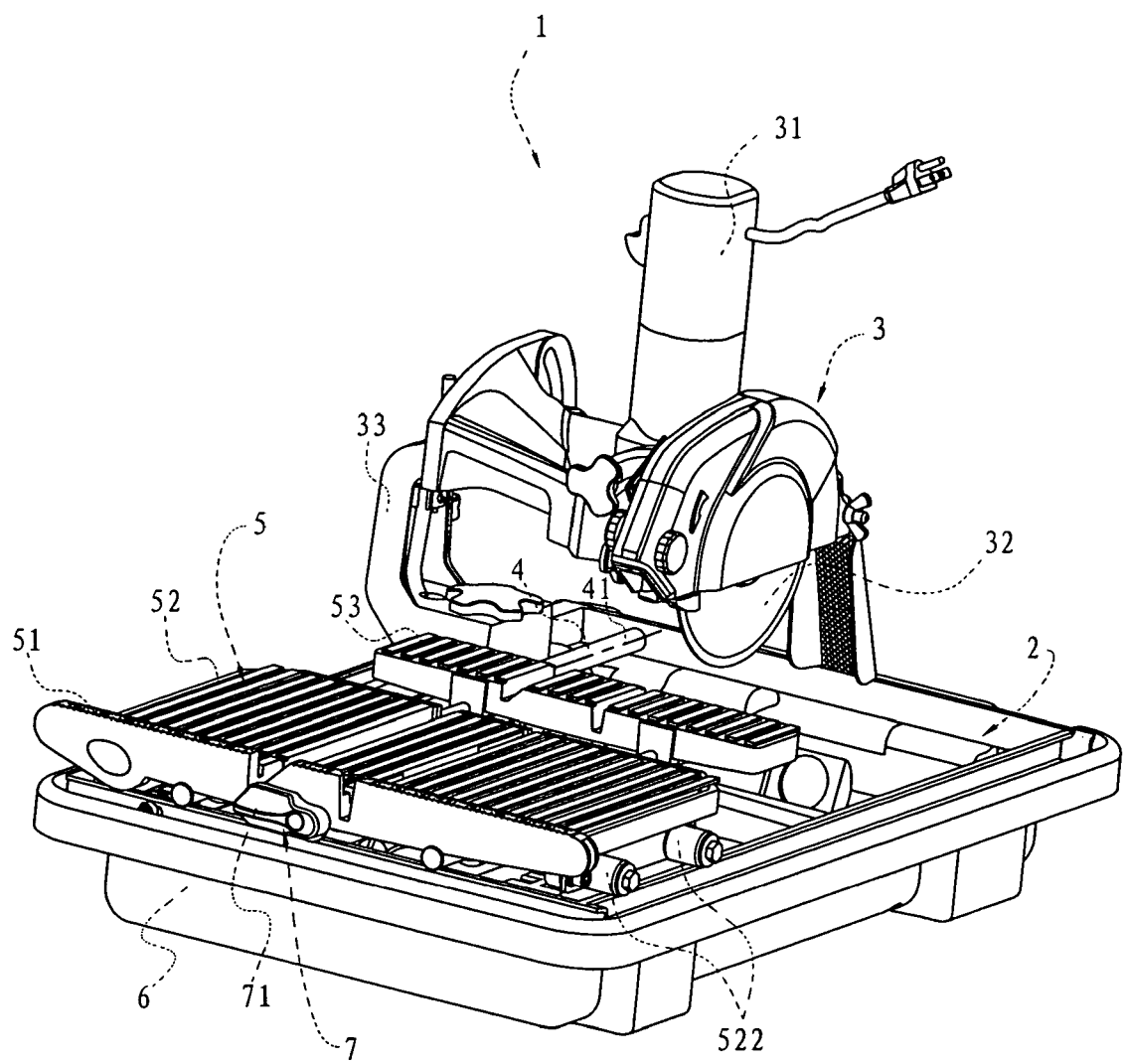
FIG. 1 is a perspective view a preferred embodiment of a tile cutter according to the present invention.
Figure 2:
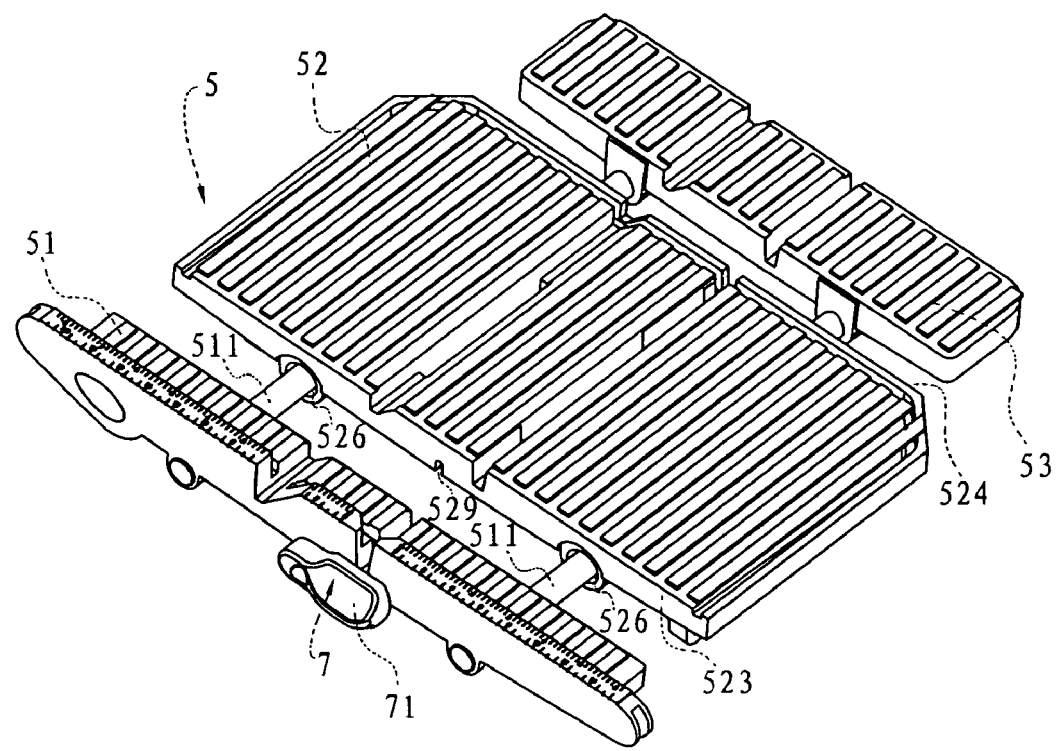
FIGS. 2-6 are perspective views of the worktable assembly of the tile cutter shown in FIG. 1 in various visual directions.
Figure 3:
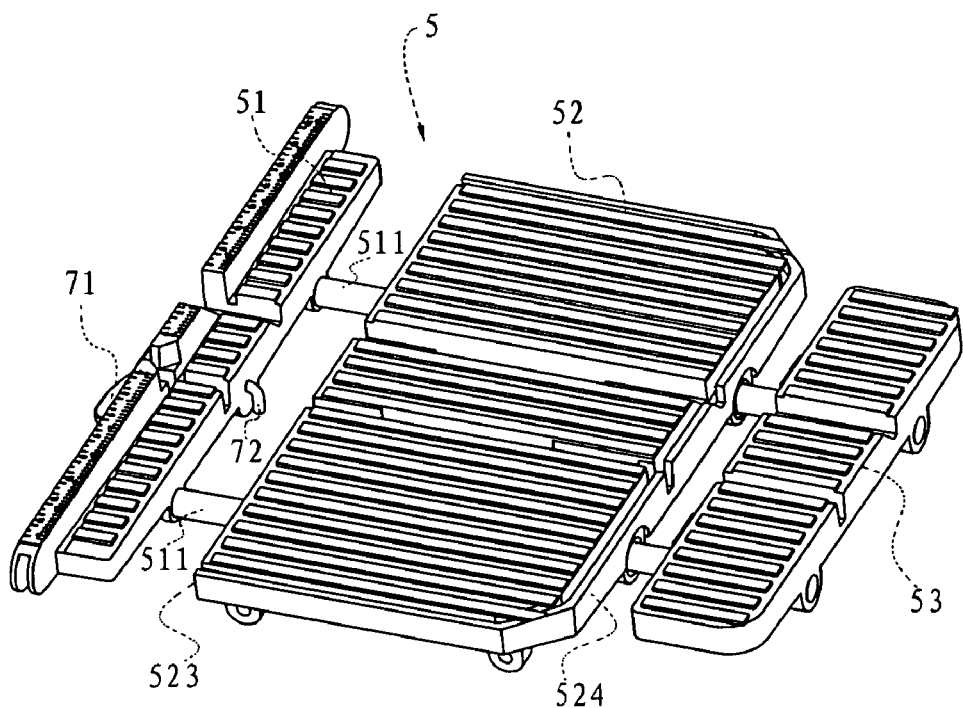
Figure 4:
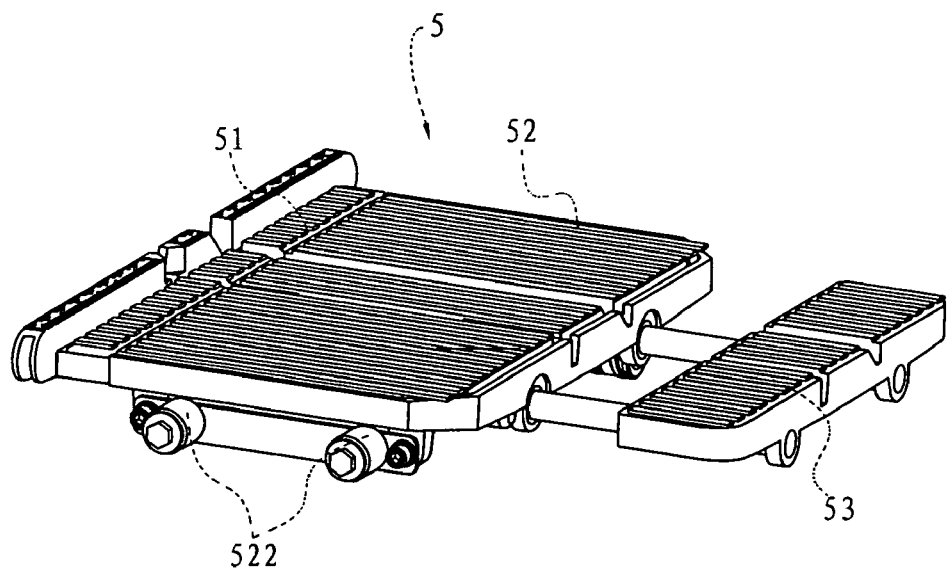

As shown in FIG. 1, a tile cutter of a preferred embodiment of the present invention comprises a support frame 2, a saw unit 3, at least one rail, and a worktable assembly 5. The support frame 2 is generally rectangular. The saw unit 3 comprises a motor 31 and a cutting element 32 driven by the motor. The saw unit 3 is installed on the support frame 2 through a C-shaped support arm. The at least one rail comprises a first rail 4. The first rail 4 has two ends fixedly mount to opposite sides of the support frame, and has a longitudinal axis 41. The longitudinal axis of the first rail 4 is parallel to the cutting direction of the cutting element 32. The tile cutter 1 may further comprise a basin 6 for supporting the support frame 2 therein. It is obvious to those skilled in the art that the support frame may have other shapes and configurations as desired, and a basin as disclosed in U.S. Pat. No. 5,676,124 can be used and to be placed in the support frame.

Referring to FIGS. 2-6, the worktable assembly 5 of the preferred embodiment comprises a first worktable 51 and a second worktable 52. A sleeve 521 is fixed at the bottom of the second worktable 52 by screws. The sleeve 521 encloses the first rail 4 such that the second worktable 52 is movable along the longitudinal axis 41 of the first rail 4. A pair of wheels 522 fixed at the bottom of the second worktable 52. The second worktable 52 installed on the first rail 4 with the wheels 522 being supported by one side level of the support frame 2 which is in parallel with the cutting direction. The second worktable 52 has two opposite ends 523, 524 perpendicular to the longitudinal axis 41 of the first rail 4.

A pair of slide bars 511 are fixed at the bottom of the first worktable 51. Two pairs of protruding portions 525 are arranged at the bottom of the second worktable 52 adjacent to one of the end 523. Each of the protruding portions 525 has a through hole 526 for slidably receiving the slide bars 511 of the first worktable 51. With the second worktable 52 being installed on the first rail 4, the slide bars 511 of the first worktable 51 are parallel to the longitudinal axis 41 of the first rail 41, and the first worktable 51 is movable relative to the second worktable 52 in a direction parallel to the longitudinal axis 41 of the first rail 4.

The worktable assembly 5 further comprises a third worktable 53. Similar to that in the first worktable 51, a pair of slide bars 531 are arranged at the bottom of the third worktable 53. Two pairs of protruding portions 527 are arranged at the bottom of the second worktable 52 adjacent to the other end 524. Each of the protruding portions has a through hole for slidably receiving the slide bars 531 of the third worktable 53. With the second worktable 52 being installed on the first rail 4, the third worktable 53 is movable relative to the second worktable 52 in a direction parallel to the longitudinal axis 41 of the first rail 4.

Figure 5:
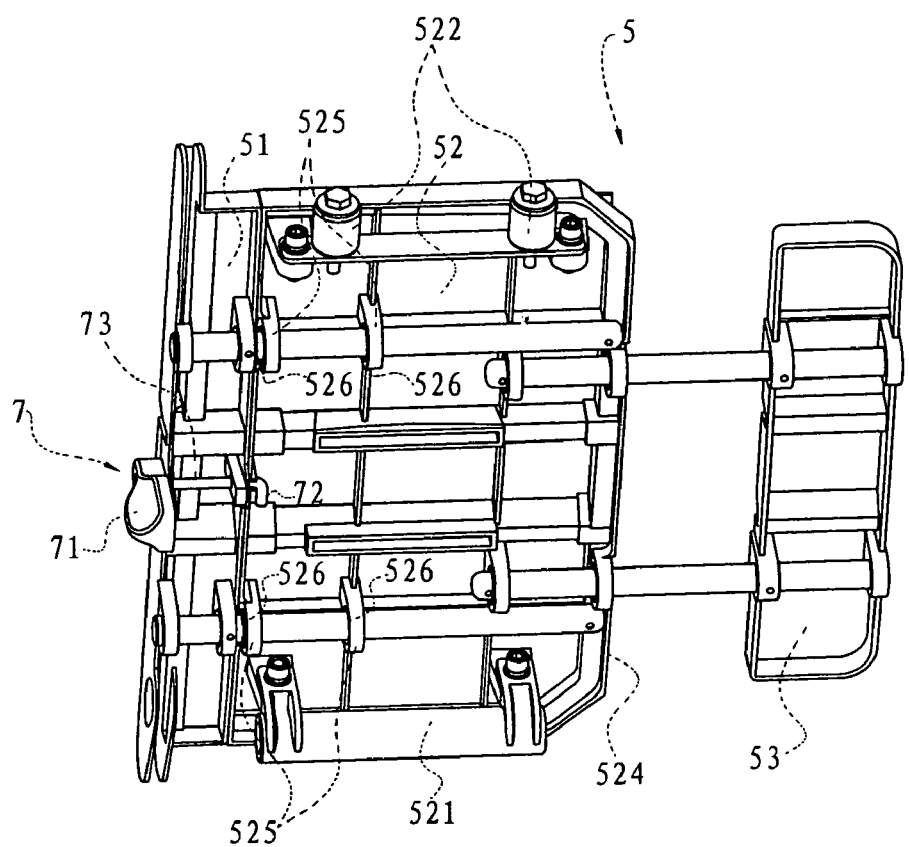
Figure 6:
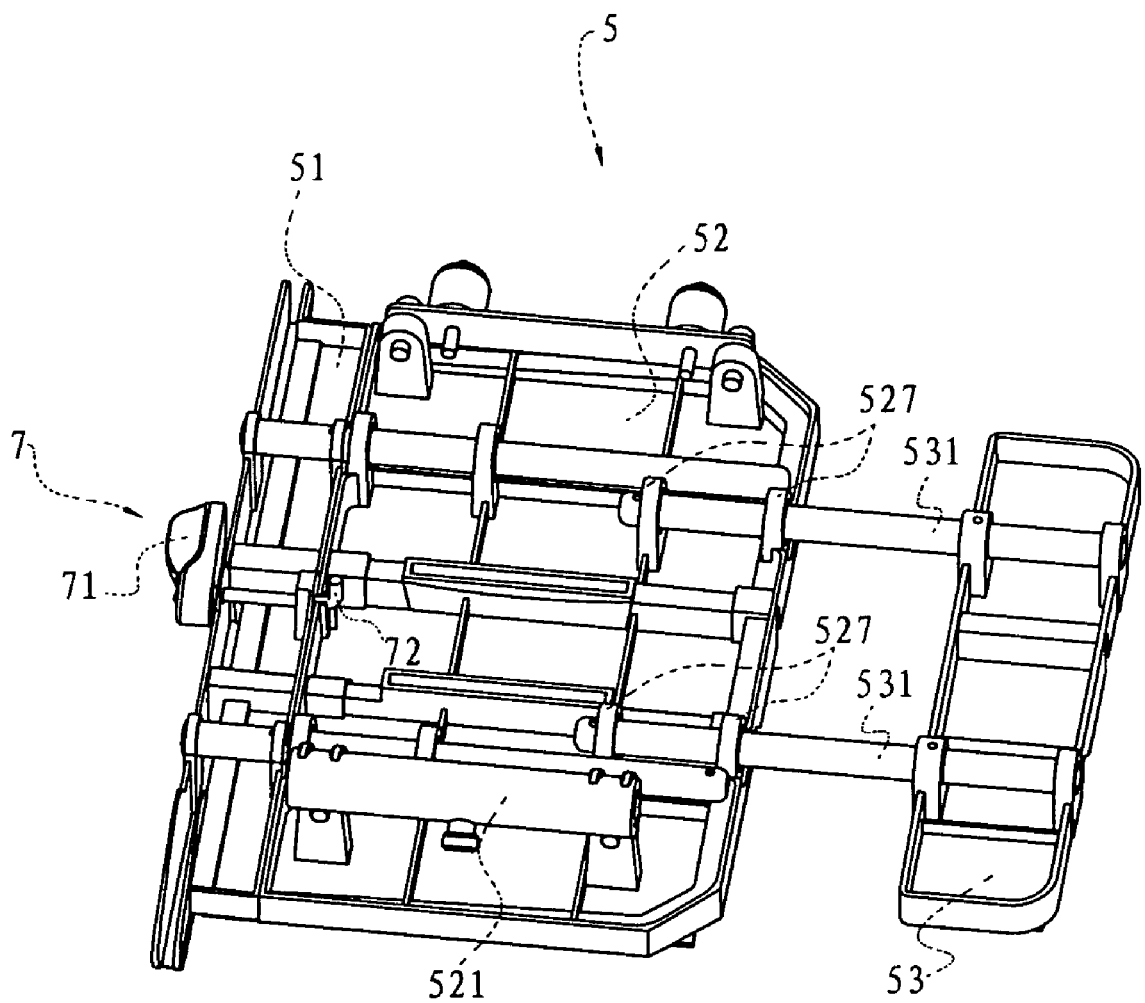

A locking device 7 is also arranged on the first worktable 51. The locking device 7 comprises a first portion 71 and a second portion 72. A recess 529 is defined, at the end 523 of the second worktable 52, corresponding to the second portion 72 of the locking device. When the locking device 7 is in the position as shown in FIG. 5, the second portion 72 of the locking device 7 is stopped by the end 523 of the second worktable 52 thereby the first worktable 51 is fixed to the second worktable 52.

The forgoing discloses and describes only exemplary embodiments of the present invention for purposes of illustration, not for limiting the scope of the present invention. It is obvious to those skilled in the art that various modifications and variations can be made without departing from the scope and spirit of the present invention. The invention should only be limited as in the claims appended below.

What is claimed is:

1. A tile cutter, comprising
   a support frame having at least one side edge,
   a saw unit being supported on the support frame,
   at least one rail fixed on the support frame and comprising a longitudinal axis, and
   a worktable assembly,
   wherein the worktable assembly comprises at least a first worktable and a second worktable, the first worktable and the second worktable each having a support surface, the support surfaces being aligned in a same predetermined plane;
   the second worktable is slidably mounted on the rail;
   the first worktable is movably coupled to the second worktable and is movable relative to the second worktable; and
   the second worktable has two opposite ends perpendicular to the longitudinal axis and the first worktable is slidably attached to at least one of the two opposite ends of the second worktable, wherein at least one slide bar is parallel with the longitudinal axis connecting the first worktable and the second worktable.

2. A tile cutter according to claim 1, wherein the first worktable is moveable to a predetermined position beyond the side edge.

3. A tile cutter according to claim 1, wherein at least one through hole is defined on either the first worktable or the second worktable for receiving therethrough said at least one slide bar.

4. A tile cutter according to claim 1, wherein the first worktable and the second worktable are each coupled to a locking device for fixing the first worktable to the second worktable.

5. A tile cutter according to claim 1, wherein the worktable assembly further comprises a third worktable having a support surface lying in the predetermined plane.

6. A tile cutter according to claim 5, wherein the third worktable is slidably connected to the other end of the two ends of the second worktable.

7. A tile cutter according to claim 6, wherein at least one slide bar is parallel to the longitudinal axis between the third worktable and the second worktable.

8. A tile cutter according to claim 7, wherein the third worktable is slidably mounted to the second worktable in the same manner as the first worktable is slidably mounted to the second worktable.

9. A tile cutter, comprising:
   a support frame having at least one side edge,
   a saw unit being supported on the support frame, and
   a worktable assembly,
   wherein the worktable assembly comprises at least a first worktable and a second worktable, the first worktable and the second worktable each having a support surface, the support surfaces being aligned in a same predetermined plane; the second worktable is slidably mounted on the support frame; and the first worktable is movably coupled to the second worktable and is movable relative to the second worktable; and,
   the second worktable has two opposite ends perpendicular to a longitudinal axis and at least one slide bar is parallel with the longitudinal axis connecting the first worktable and the second worktable.

10. A tile cutter according to claim 9, wherein the first worktable is moveable to a predetermined position beyond the side edge.

11. A tile cutter according to claim 9, wherein a basin is removably connected to the support frame.

12. A tile cutter, comprising:
    a support frame having at least one side edge,
    a saw blade having a cutting direction being supported on the support frame, and
    a worktable assembly,
    wherein the worktable assembly comprises at least a first worktable and a second worktable, the first worktable and the second worktable each having a support surface, the support surfaces being aligned in a same predetermined plane; the second worktable is slidably mounted on the support frame in a direction parallel to the cutting direction of the saw blade;
    the first worktable is movably coupled to the second worktable in the direction parallel to the cutting direction of the saw blade;
    the first worktable further being movable relative to the second worktable; and
    the second worktable has two opposite ends perpendicular to a longitudinal axis and at least one slide bar is parallel with the longitudinal axis connecting the first worktable and the second worktable.

13. A tile cutter according to claim 12, wherein the first worktable is moveable to a predetermined position beyond the side edge.

14. A tile cutter according to claim 12, wherein a basin is removably connected to the support frame.

* * * * *